(12) United States Patent
Fujita

(10) Patent No.: US 8,068,938 B2
(45) Date of Patent: Nov. 29, 2011

(54) METHOD AND SYSTEM FOR MANAGING A LOAD DEMAND ON AN ELECTRICAL GRID

(75) Inventor: Lincoln Mamoru Fujita, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 12/466,648

(22) Filed: May 15, 2009

(65) Prior Publication Data

US 2010/0292856 A1  Nov. 18, 2010

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G01R 21/00* (2006.01)
*G01R 21/06* (2006.01)

(52) U.S. Cl. ........ 700/295; 700/286; 700/291; 700/297; 702/60; 702/61

(58) Field of Classification Search ............... 700/286, 700/291, 295, 297; 702/60–61
See application file for complete search history.

(56) References Cited

U.S. PATENT DOCUMENTS

| 4,023,043 | A | * | 5/1977 | Stevenson | 307/38 |
|---|---|---|---|---|---|
| 7,274,975 | B2 | | 9/2007 | Miller | |
| 2003/0009401 | A1 | * | 1/2003 | Ellis | 705/35 |
| 2003/0187550 | A1 | * | 10/2003 | Wilson et al. | 700/295 |
| 2004/0117136 | A1 | * | 6/2004 | Uggerud et al. | 702/61 |
| 2005/0154499 | A1 | * | 7/2005 | Aldridge et al. | 700/286 |
| 2006/0095164 | A1 | | 5/2006 | Donnelly et al. | |
| 2006/0276938 | A1 | * | 12/2006 | Miller | 700/295 |
| 2007/0276547 | A1 | * | 11/2007 | Miller | 700/295 |
| 2008/0040296 | A1 | * | 2/2008 | Bridges et al. | 705/412 |
| 2008/0272934 | A1 | * | 11/2008 | Wang et al. | 340/870.11 |
| 2008/0281473 | A1 | * | 11/2008 | Pitt | 700/291 |
| 2008/0281663 | A1 | * | 11/2008 | Hakim et al. | 705/8 |
| 2010/0049494 | A1 | * | 2/2010 | Radibratovic et al. | 703/13 |
| 2010/0179704 | A1 | * | 7/2010 | Ozog | 700/291 |
| 2010/0264739 | A1 | * | 10/2010 | Errington | 307/80 |
| 2010/0295482 | A1 | * | 11/2010 | Chemel et al. | 315/312 |

OTHER PUBLICATIONS

Zakaria, Fareed,The Case for Brainy Power, Newsweek, Nov. 24, 2008, 2 pgs., http://www.newsweek.com/id/169165/output/print.

* cited by examiner

*Primary Examiner* — Ramesh Patel
(74) *Attorney, Agent, or Firm* — Armstrong Teasdale LLP

(57) ABSTRACT

A method for managing electrical demand on a power grid in response to electrical supply conditions is described. The method includes determining a first energy demand forecast using stored information, determining a first energy supply forecast based on a known energy production and transmission capacity, and comparing the first energy demand forecast to the first energy supply forecast. The method also includes transmitting at least one of an adjusted price signal and an electrical load shedding signal to a customer over a bi-directional communication system based on the comparison of the first energy demand forecast to the first energy supply forecast.

20 Claims, 8 Drawing Sheets

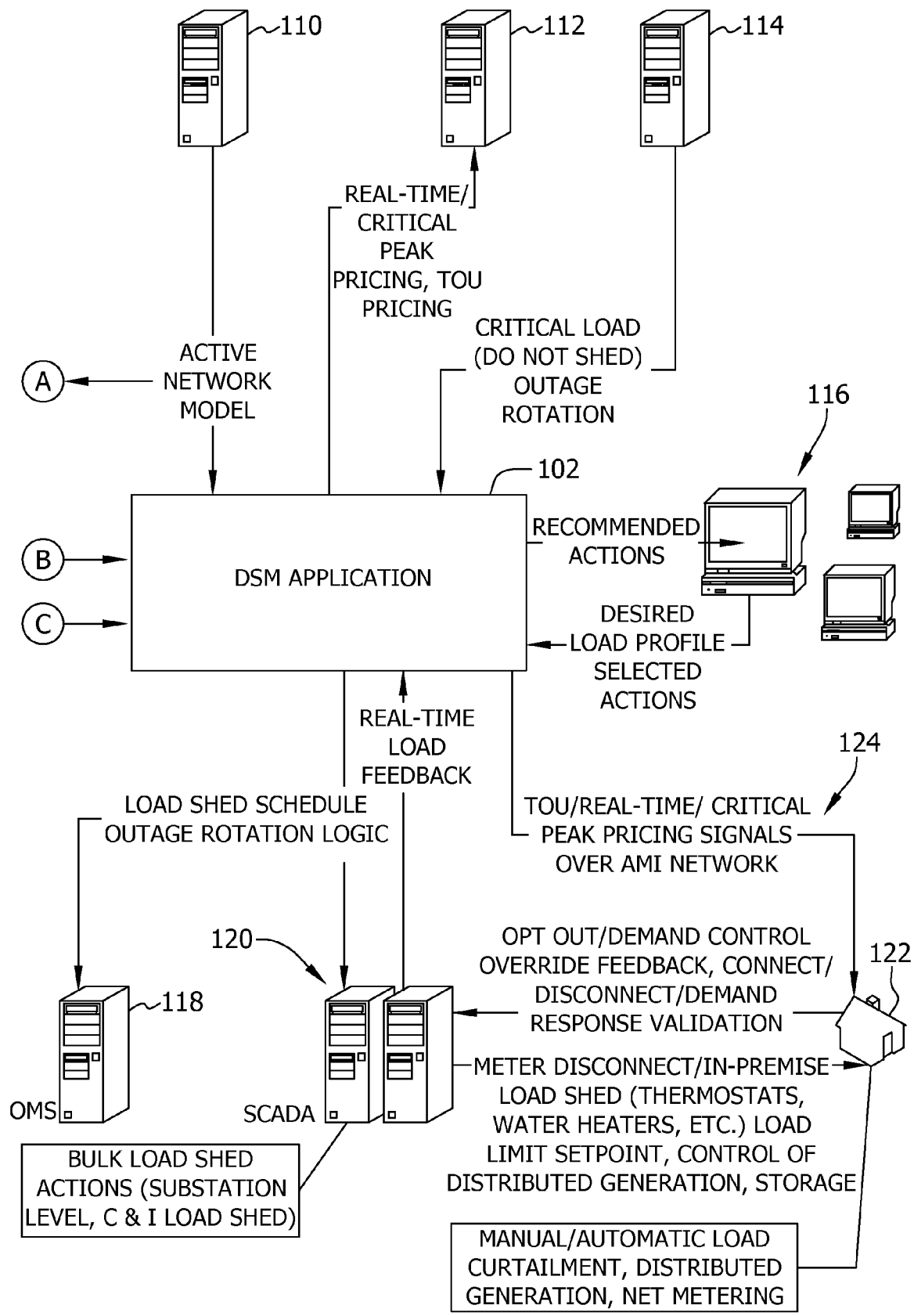

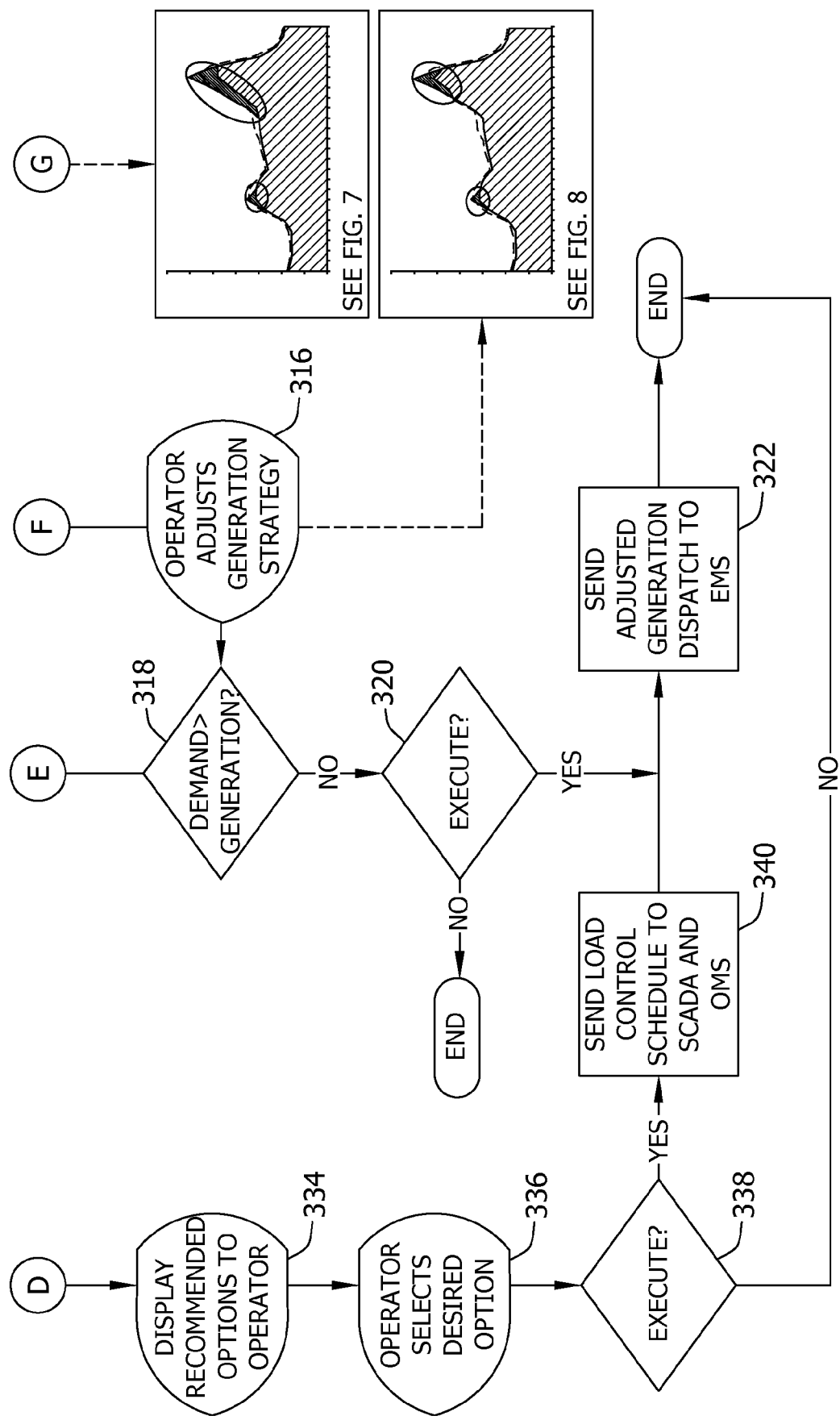

METHOD AND SYSTEM FOR MANAGING A LOAD DEMAND ON AN ELECTRICAL GRID

BACKGROUND OF THE INVENTION

The field of the present disclosure relates generally to the generation and delivery of electricity and more specifically, to a method and system for managing peak electricity demand.

As energy demand around the world has increased, environmental concerns and energy price volatility has increased interest in energy conservation and in alternative energy sources. Programmable thermostats have permitted consumers to program their heating and cooling systems to reduce consumption during certain time periods, for example, when they are not home or are asleep. Solar panels, fuel cells, windmills, back-up generators, and other energy sources have become increasingly available for use in residential homes and businesses. However, the use of such alternative energy sources and technologies may have been limited due to, for example, difficulty in recovering costs, unpredictability of alternative energy supplies (e.g., sun, wind, etc.), and/or a difficulty in integrating such sources and technologies into conventional electrical distribution systems.

Some electric utilities charge varying rates based on demand. For example, during periods of peak demand, a higher rate for electricity may be charged. Conversely, during low-demand periods, a lower rate may be charged. The inability of some types of energy users to curtail energy use and the lack of real-time information regarding the immediate cost of energy usage may limit the success of a variable rate program.

BRIEF DESCRIPTION OF THE INVENTION

In one aspect, a method for managing electrical demand on a power grid in response to electrical supply conditions is provided. The method includes determining a first energy demand forecast using stored information, determining a first energy supply forecast based on a known energy production and transmission capacity, and comparing the first energy demand forecast to the first energy supply forecast. The method also includes transmitting at least one of an adjusted price signal and an electrical load shedding signal to a customer over a bi-directional communication system based on the comparison of the first energy demand forecast to the first energy supply forecast.

In another aspect, a system for managing electrical demand on a power grid in response to electrical supply conditions is provided. The system includes a processing device and a bi-directional communication system. The processing device is configured to forecast a first energy demand forecast using stored information, determine a first energy supply forecast based on known energy production and transmission capacity, compare the first energy demand forecast to the first energy supply forecast, and provide a demand side management (DSM) signal based at least partially on the comparison of the first energy demand forecast and the first energy supply forecast. The bi-directional communication system communicatively couples the processing device to a plurality of customers. The bi-directional communication system is configured to receive the DSM signal from the processing device and to provide predetermined customers of the plurality of customers with the DSM signal.

BRIEF DESCRIPTION OF THE DRAWINGS

FIGS. 2A and 2B show a block diagram of an exemplary demand side management system.

FIGS. 4A and 4B show an exemplary DSM application flow chart that further describes the method shown in FIG. 3.

DETAILED DESCRIPTION OF THE INVENTION

The embodiments described herein include an exemplary energy production and transmission system for use in the generation and delivery of electricity to customers. The embodiments described herein facilitate the management of electrical demand in response to electrical supply conditions.

A first technical effect of the energy production and transmission system described herein is to provide direct control of loads included within the transmission system. The first technical effect is at least partially achieved by transmitting an electrical load shedding signal to a customer over an advance metering infrastructure (AMI). A second technical effect of the energy production and transmission system described herein is to provide indirect control of loads included within the transmission system. The second technical effect is at least partially achieved by transmitting an adjusted price signal to a customer over an AMI.

Figure 1:
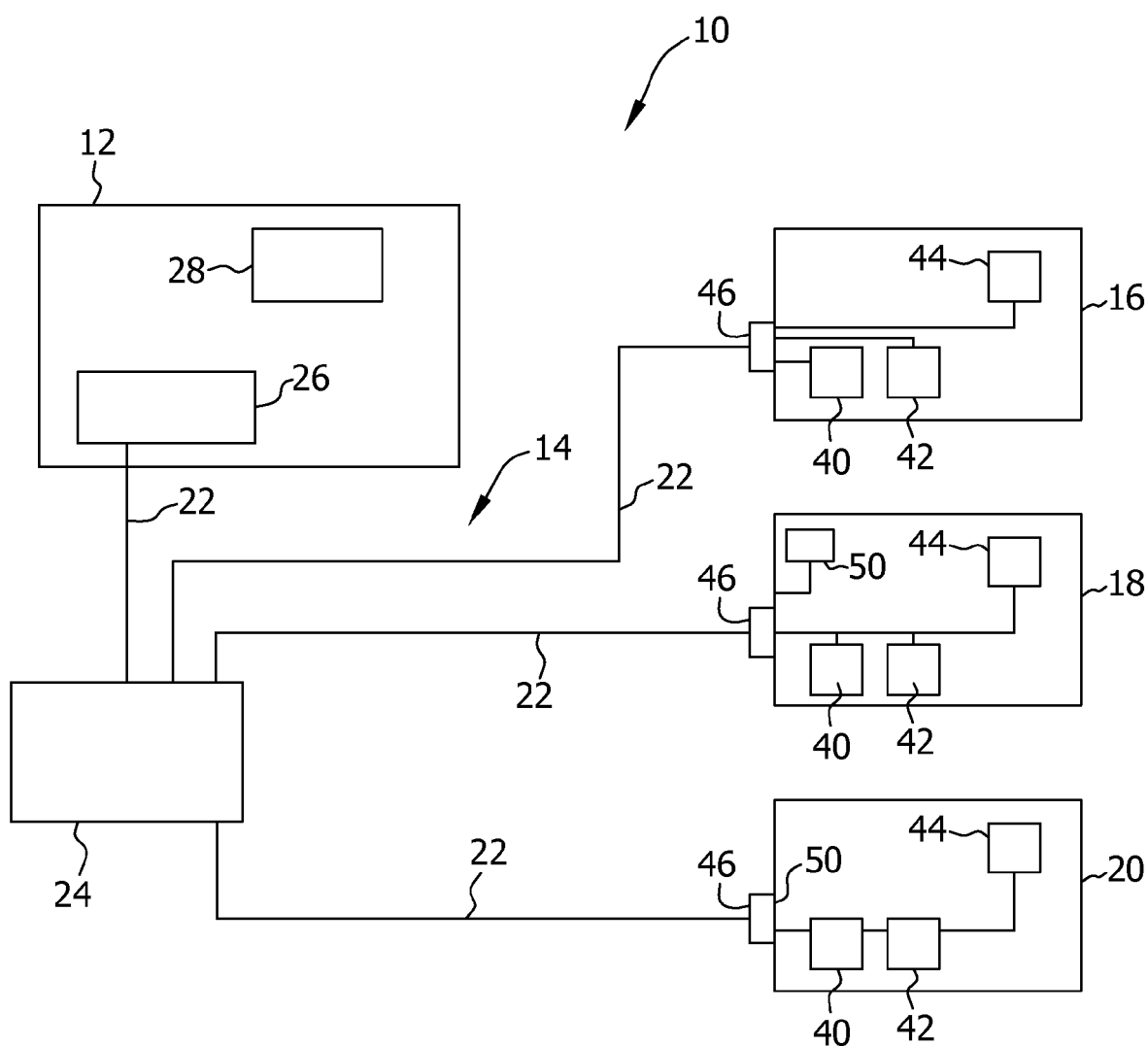
FIG. 1 is a block diagram of an exemplary energy production and transmission system.

FIG. 1 is a block diagram of an exemplary energy production and transmission system 10 that includes an electric utility 12, a power grid 14, and a plurality of customer locations 16, 18, and 20. Electricity is delivered from electric utility 12 to customer locations 16, 18, and 20 via electric power grid 14. In the exemplary embodiment, electric power grid 14 includes a plurality of transmission lines 22 and an electrical substation 24. Electric utility 12 includes an electric generator 26 that supplies electrical power to power grid 14. Generator 26 may be driven by, for example, a gas turbine engine, a hydroelectric turbine, and/or a wind turbine. Electric utility 12 also includes a computer system 28 configured to control energy production and transmission. Computer system 28 is illustrated as being included within electric utility 12, however, computer system 28 may be external to electric utility 12 (e.g., remotely located) and in communication with electric utility 12. Furthermore, although described as a computer system, computer system 28 may be any suitable processing device that enables energy production and transmission system 10 to function as described herein. In the exemplary embodiment, computer system 28 is further configured a as part of a demand side management (DSM) system, described in more detail below.

In the exemplary embodiment, customer locations 16, 18, and 20 include electric loads, for example, loads 40, 42, and 44. Moreover, in the exemplary embodiment, customer locations 16, 18, and 20 also include an end user meter 46. In the exemplary embodiment, end user meter 46 is part of an advanced metering infrastructure (AMI). The AMI is an example of a bidirectional communication system that enables electric utility 12 to measure and collect information relevant to energy usage from customer locations 16, 18, and 20, as well as control loads 40, 42, and 44. For example, using the AMI, electric utility 12 may prevent load 40 from receiving electricity from power grid 14, an operational concept also referred to herein as "shedding" load 40 from power grid 14. In an alternative embodiment, at least one load 40, 42, and/or 44 may be a "smart device." As defined herein, smart devices include a communication device that facilitates receiving a shedding signal from electric utility 12 and turning-off the device after receiving the shedding signal. Loads 40, 42, and 44 may be communicatively coupled in any way that facilitates operation of the AMI as described herein, three of which are shown within customer locations 16, 18, and 20.

In the exemplary embodiment, end user meter 46 may include, or may be coupled to, a display 50. For example, display 50 may include a computer monitor or a liquid crystal display configured to display an adjusted energy price and/or a request that the customer turn-off a load during a suggested time period. Furthermore, the AMI may be configured to provide the customer with the adjusted energy price and/or request for removal of a load in any manner that enables energy production and transmission system 10 to function as described herein, for example, sending instructions by e-mail, phone call, or text message.

Figure 2A:
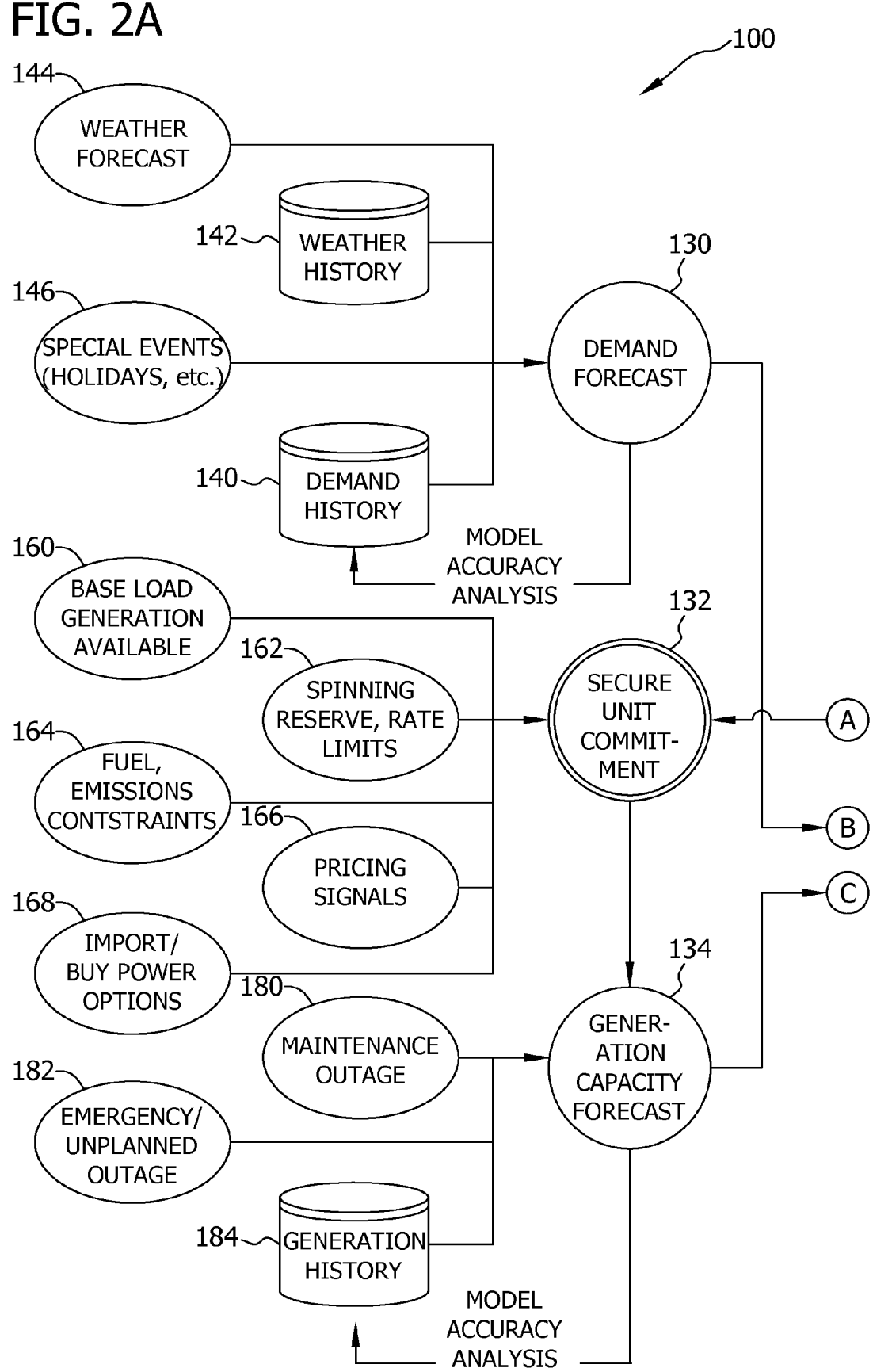

FIGS. 2A and 2B show a block diagram of an exemplary DSM system 100. In the exemplary embodiment, DSM system 100 includes a core DSM application 102. DSM system 100 also includes a network model manager 110, a billing system 112, a customer information system 114, a decision support system 116, an outage management system 118, and an electrical grid supervisory control and data acquisition (SCADA) system 120. Individual electrical customers 122 are connected via a bi-directional communication system, for example, an advanced metering infrastructure (AMI) 124. In the exemplary embodiment, demand side management application 102 includes a demand forecast module 130, a secure unit commitment module 132, and a generation capacity forecast module 134. In the exemplary embodiment, the functionality of DSM application 102, network model manager 110, billing system 112, customer information system 114, decision support system 116, and outage management system 118 is performed by computer 28 (shown in FIG. 1). However, the functions of DSM application 102, network model manager 110, billing system 112, customer information system 114, decision support system 116, and outage management system 118 may be performed by multiple, centrally located computers, or multiple, remotely located computers.

In the exemplary embodiment, demand forecast module 130 interfaces with databases, for example, an historical demand database 140 and an historical weather database 142, as well as with a real-time weather database 144 and a real-time special event database 146. In the exemplary embodiment, demand forecast module 130 uses data stored in databases 140, 142, 144, and 146 to determine an electrical demand forecast for an upcoming predetermined time period. For example, demand forecast module 130 may determine an electrical demand forecast that includes the expected energy demand from customers, for example, customers 16, 18, and 20 (shown in FIG. 1) for the upcoming month, the upcoming week, the next fifteen minutes, or any predetermined future time period. Demand forecast module 130 may also determine an electrical demand forecast for a time period beginning at a future time, for example, an electrical demand forecast for a day after the demand forecast is generated, or an electrical demand forecast for an upcoming week beginning three days after the demand forecast is generated. In the exemplary embodiment, demand forecast module 130 may determine an electrical demand forecast for any time period and/or delay desired, although greater accuracy may be seen with more immediate forecasts. In the exemplary embodiment, demand forecast module 130 forecasts a change in energy demand over time, for example, an expected change in energy demand at each hour of an upcoming day. In some embodiments, demand forecast module 130 forecasts an aggregate demand amount, over time, for the grid. In the exemplary embodiment, demand forecast module 130 analyzes demand forecast accuracy by comparing a past demand forecast with the actual electrical demand over the same time period. In the exemplary embodiment, a database of these analyses is maintained to increase the accuracy of future demand forecasts.

In the exemplary embodiment, secure unit commitment module 132 and generation capacity forecast module 134 provide an energy generation forecast to DSM application 102. The energy generation forecast includes a forecast of an expected level of energy generation during a forecast time period. Secure unit commitment module 132 receives available base load generation data 160, stored power availability data 162, regulatory generation restraint data 164, real-time energy pricing signals 166, and/or data related to access to real-time energy markets 168. In the exemplary embodiment, secure unit commitment module 132 determines an initial available energy generation forecast based at least in part on data 160, 162, 164, 166, and 168. Generation capacity forecast module 134 receives the initial available energy generation forecast from secure unit commitment module 132 and modifies the initial available energy generation forecast by applying planned maintenance data 180 and emergency maintenance action data 182 to determine a final energy generation forecast. For example, generation capacity forecast module 134 may reduce the initial available energy generation forecast at times associated with planned maintenance actions on utility 12 (shown in FIG. 1). Along with transmitting the final energy generation forecast to DSM application 102, capacity generation forecast module 134 also saves the forecast in a generation forecast database 184 to be used for forecast accuracy analysis.

In the exemplary embodiment, network model manager 110 provides network connectivity data to secure unit commitment module 132 and DSM application 102. Moreover, in the exemplary embodiment, the network connectivity data is used to determine an energy transmission capability of power grid 14 (shown in FIG. 1). The energy transmission capability includes an amount of electricity that power grid 14 is capable of delivering to consumers 16, 18, and 20 (shown in FIG. 1). In addition, in the exemplary embodiment, network model manager 110 is common information model (CIM) compliant and is configured to receive data from a bi-directional communication system, for example, an intelligent grid and/or an AMI system. Network model manager 110 receives the final energy generation forecast from DSM application 102 and reduces the final energy generation forecast to determine an energy supply forecast. The final energy generation forecast may be reduced at times when power grid 14 (shown in FIG. 1) is not capable of delivering the level of electricity that generator 26 (shown in FIG. 1) is capable of producing. In the exemplary embodiment, an energy supply forecast map is created by applying grid energy transmission constraints to the final available energy generation forecast.

In the exemplary embodiment, billing system 112 provides DSM application 102 with real-time pricing information based at least partially on data provided to billing system 112 by DSM application 102. For example, billing system 112 provides DSM application 102 with pricing information based on an energy demand forecast and an energy supply forecast. In the exemplary embodiment, billing system 112 is configured for time of use (TOU) pricing. For example, pricing may be determined by billing system 112 substantially instantaneously. Additionally, pricing may be determined by billing system 112 on a minute-by-minute basis, or any other term that allows DSM application 102 to function as described herein. In some embodiments billing system 112 may generate pricing information that is characterized into discrete pricing groups, for example, normal pricing for low use time periods, enhanced pricing for high energy use time periods, and emergency pricing for critical energy use time periods.

In the exemplary embodiment, customer information system 114 provides DSM application 102 with a list of critical loads and may be configured to determine an outage rotation schedule for use when DSM application 102 determines that an electrical load should be removed, i.e., "shed," from power grid 14 (shown in FIG. 1). In an alternative embodiment, customer information system 114 stores a predetermined outage rotation schedule created by, for example, an electrical utility operator.

In the exemplary embodiment, decision support system 116 receives data corresponding to recommended actions determined by DSM application 102 and transmits operator responses to DSM application 102. For example, data corresponding to a demand forecast, a supply forecast, and/or an energy transmission capability may be provided to decision support system 116 for use by an electric utility operator. In the exemplary embodiment, recommended actions are displayed by decision support system 116 along with a user interface that receives operator instructions. For example, the recommended actions may include transmitting an adjusted price signal and/or an electrical load shedding signal to predetermined customer locations and the user interface may enable the operator to authorize, disapprove, or edit the recommended action.

In the exemplary embodiment, outage management system 118 receives the planned outage rotation from DSM application 102 and distinguishes planned outages from unplanned outages. Distinguishing between planned outages and unplanned outages facilitates preventing outage management system 118 from dispatching maintenance crews to investigate outages that were pre-planned and executed by the energy provider. Furthermore, SCADA system 120 interfaces with DSM application 102, end user meters, and/or smart home devices, for example, AMI meter 46 (shown in FIG. 1), to regulate individual loads. SCADA system 120 also tracks voluntary end user load shedding and cases of end user load shedding overrides to continually update the load shedding schedule.

Figure 3:
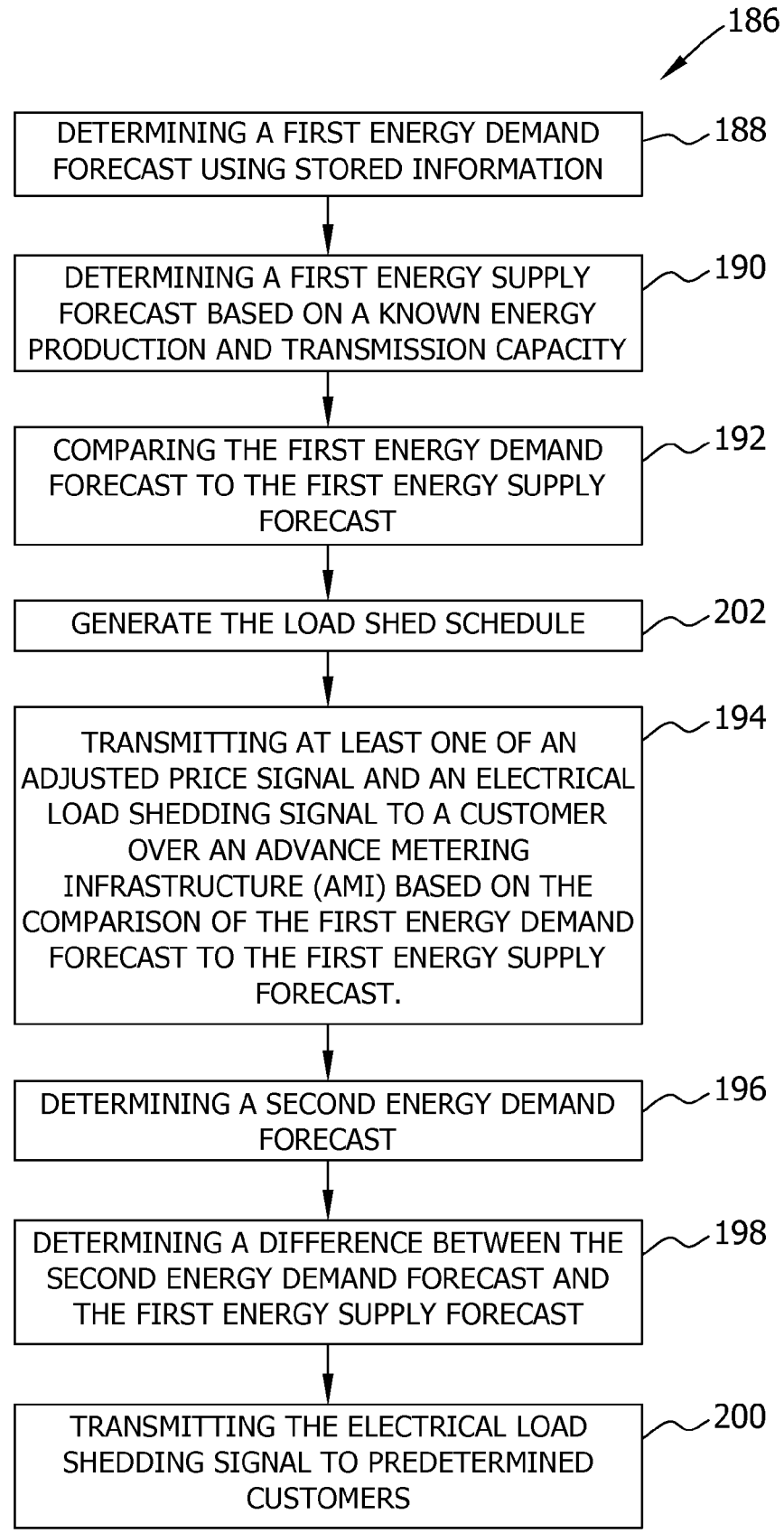
FIG. 3 is a flow chart of an exemplary method for managing electrical demand on a power grid in response to electrical supply conditions.

FIG. 3 is a flow chart 186 illustrating an exemplary method for managing electrical demand on a power grid, for example, power grid 14 (shown in FIG. 1) in response to electrical supply conditions. In the exemplary embodiment, the method includes determining 188 a first energy demand forecast using stored information. The stored information may include, for example, historical demand information, historical weather information, real-time weather information, and/or weather forecast information. Furthermore, as described above, information stored in databases 140 and 142 (shown in FIG. 2A) may be accessed by demand forecast module 130 (shown in FIG. 2A) and used to determine 188 the first energy demand forecast. The method also includes determining 190 a first energy supply forecast based on a known energy production and transmission capacity. For example, as described above, secure unit commitment module 132 (shown in FIG. 2A) determines an initial energy generation forecast based on available base load generation data 160, stored power availability data 162, regulatory generation restraint data 164, real-time energy pricing signals 166, and/or data related to access to real-time energy markets 168. Generation capacity forecast module 134 receives the initial energy generation forecast from secure unit commitment module 132 and modifies the initial energy generation forecast by applying planned maintenance data 180 and emergency maintenance action data 182 to determine the final energy generation forecast. Network model manager 110 receives the final energy generation forecast from DSM application 102 and reduces the final energy generation forecast to determine the first energy supply forecast.

In the exemplary embodiment, the method also includes comparing 192 the first energy demand forecast to the first energy supply forecast and transmitting 194 at least one of an adjusted price signal and an electrical load shedding signal to a customer over an advanced metering infrastructure (AMI) when the first energy demand forecast is greater than the first energy supply forecast for a given time period. In some embodiments, comparing 192 the first energy demand forecast to the first energy supply forecast may include providing a graphical display of the first energy demand and the first energy supply to a power grid operator and providing the power grid operator with inputs for selection of potential loads to be shed. For example, data corresponding to the first demand forecast, the first supply forecast, and/or an energy transmission capability of power grid 14 (shown in FIG. 1) may be provided to decision support system 116 (shown in FIG. 2B) for use by an operator. Recommended actions may be displayed by decision support system 116 along with a user interface that facilitates receiving operator instructions. For example, the recommended actions may include transmitting 194 an adjusted price signal and/or an electrical load shedding signal to predetermined customer locations and the user interface may allow the operator to authorize, disapprove, or edit the recommended action.

Information transmitted 194 may enable a calculated adjusted price to be transmitted 194 as the adjusted price signal, based at least partially on the comparison 192 of the first energy demand forecast to the first energy supply forecast. The adjusted price signal notifies the customer of a price change, and thus provides an incentive for the customer to reduce electricity usage during higher price time periods. Transmitting 194 may also include at least one of transmitting 194 a signal requesting that a customer remove an electrical load from the power grid or generally reduce energy usage over an upcoming period of time, and transmitting 194 a signal that automatically removes an electrical load from the power grid. For example, a customer and the electric utility may have an agreement that the electric utility will charge the customer a lower rate if the customer agrees to either manually remove electrical loads from the power grid upon request, or allows the electric utility to automatically remove electrical loads from the power grid when the utility determines it would be beneficial to reduce demand.

In some embodiments, transmitting 194 includes sending at least one of the adjusted price signal and the electrical load shedding signal to the customer over an AMI, for example, over at least one of a wireless communication network and a broadband over power line communication network.

In the exemplary embodiment, the method may also include determining 196 a second energy demand forecast based on a customer response to the adjusted price signal or the request to remove electrical loads from the power grid.

The method may also include determining 198 a difference between the second energy demand forecast and the first energy supply forecast and transmitting 200 the electrical load shedding signal to predetermined customers to shed a quantity of electrical loads greater than the difference between the second energy demand and the first energy supply. By determining 198 the difference between the second energy demand forecast and the first energy supply forecast, the method for managing electrical demand on the power grid becomes an iterative process, wherein transmitting 194 and 200 may be performed as many times as is needed to achieve the desired demand forecast.

In some embodiments, the method may include generating 202 a load shed schedule that rank orders loads available for shedding. For example, customer information system 114 (shown in FIG. 2B) may provide DSM application 102 (shown in FIG. 2B) with a load shed schedule for use when DSM application 102 determines that an electrical load should be shed. The load shed schedule may include a list of critical loads that should not be shed. In the exemplary embodiment, customer information system 114 generates the load shed schedule. In an alternative embodiment, customer information system 114 may store a predetermined load shed schedule created by, for example, an electrical utility operator.

Figure 4A:
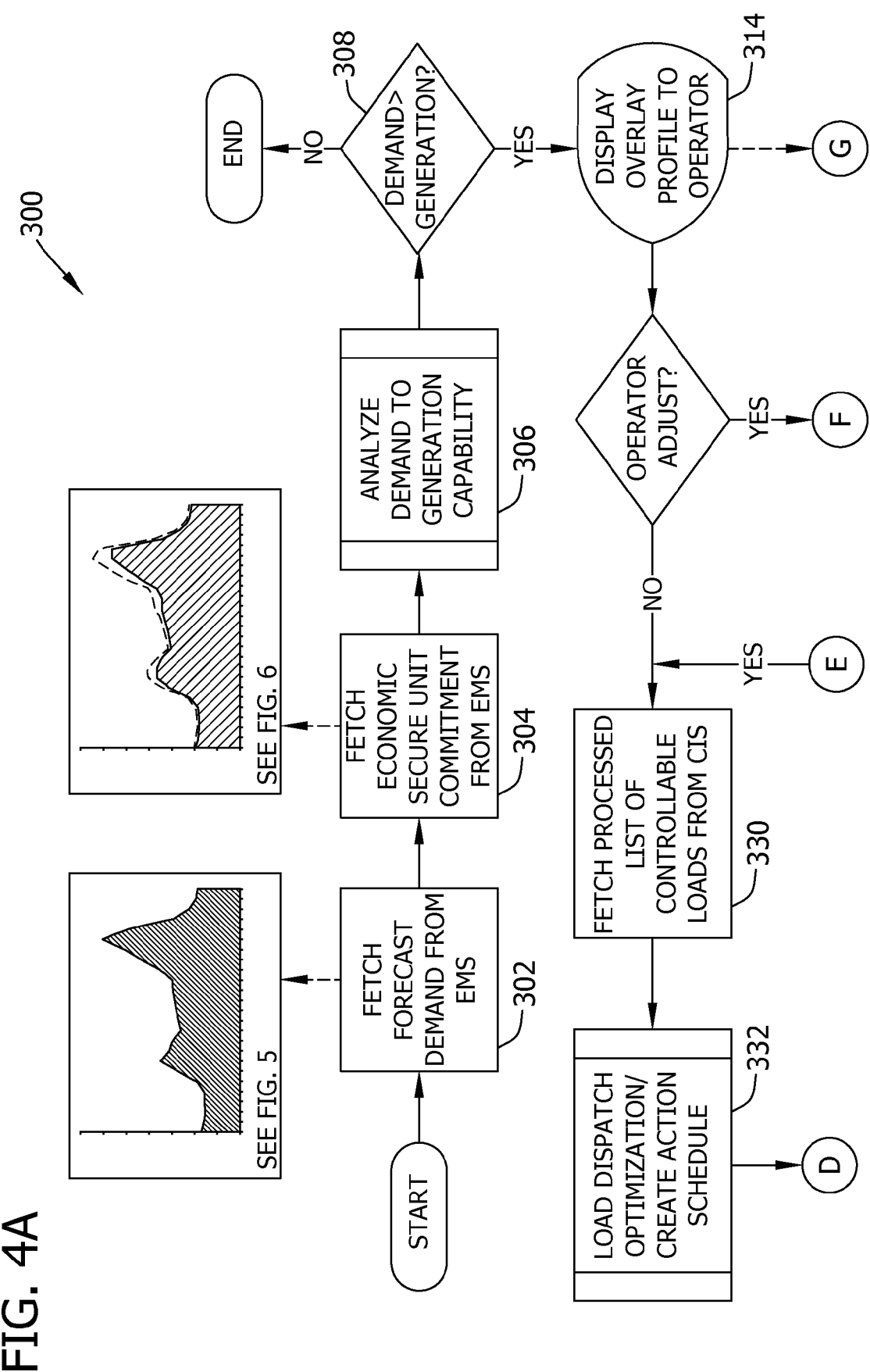
Figure 5:
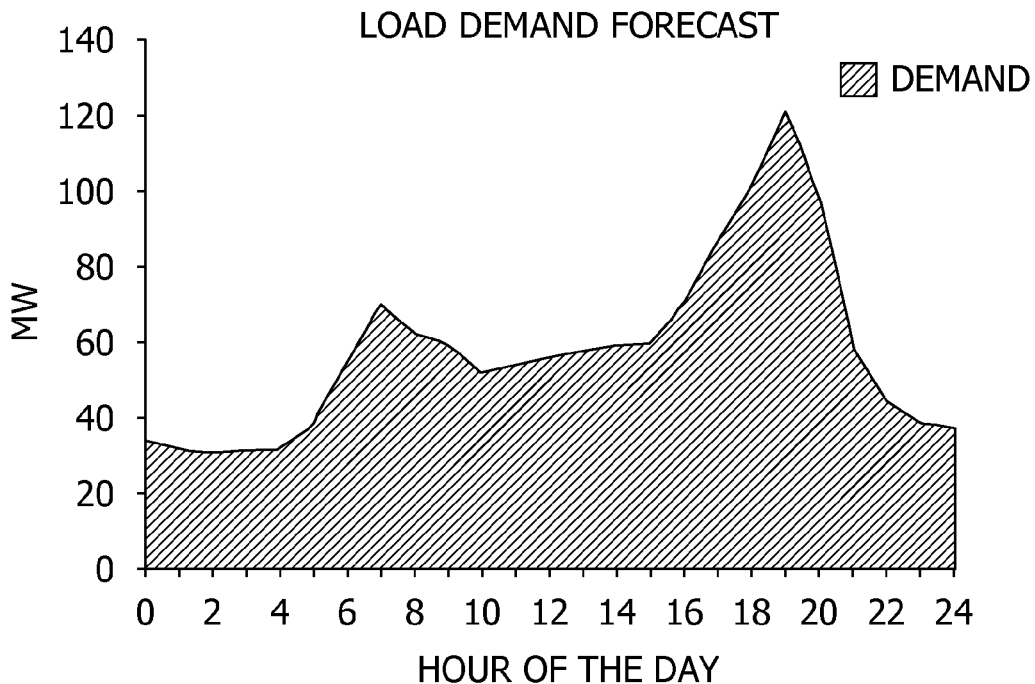
FIG. 5 shows an example of a demand forecast that predicts an amount of electricity that will be used over an upcoming twenty-four hour time period.
Figure 6:
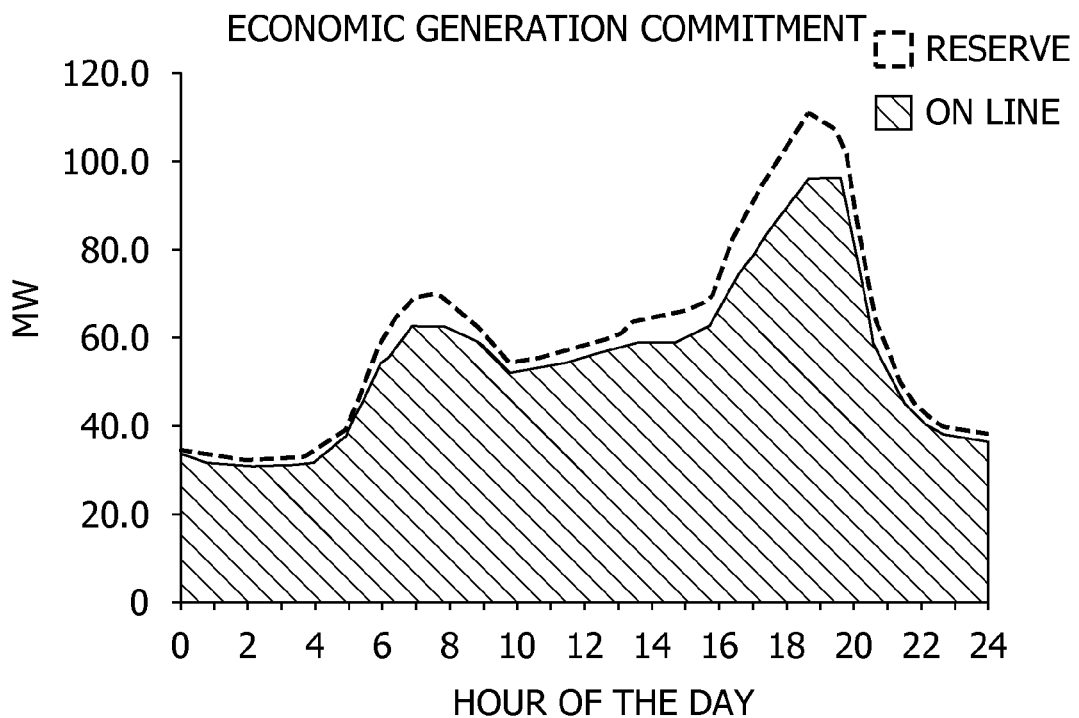
FIG. 6 shows an example of an energy supply forecast that predicts an amount of electricity that can be generated and delivered to customers during the twenty-four hour time period illustrated in FIG. 5.

FIGS. 4A and 4B show an exemplary DSM application flow chart 300, that further describes the method shown in FIG. 3. For example, DSM application 102 (shown in FIG. 2B) receives 302 a demand forecast from, for example, demand forecast module 130 (shown in FIG. 2A), and receives 304 an energy supply forecast from, for example, secure unit commitment module 132 (shown in FIG. 2A). FIG. 5 illustrates an exemplary demand forecast that predicts an amount of electricity that will be used (measured in megawatts, MW) over an upcoming twenty-four hour time period. FIG. 6 illustrates an exemplary energy supply forecast that predicts an amount of electricity that can be generated and delivered to customers over the same upcoming twenty-four hour time period. In the exemplary embodiment, the demand forecast and energy supply forecast are analyzed 306, for example, by comparing 308 the demand forecast to the energy supply forecast. If demand is less than a corresponding forecasted energy supply at all times within the demand forecast, the method for managing electrical demand in response to electrical supply conditions is complete.

Figure 7:
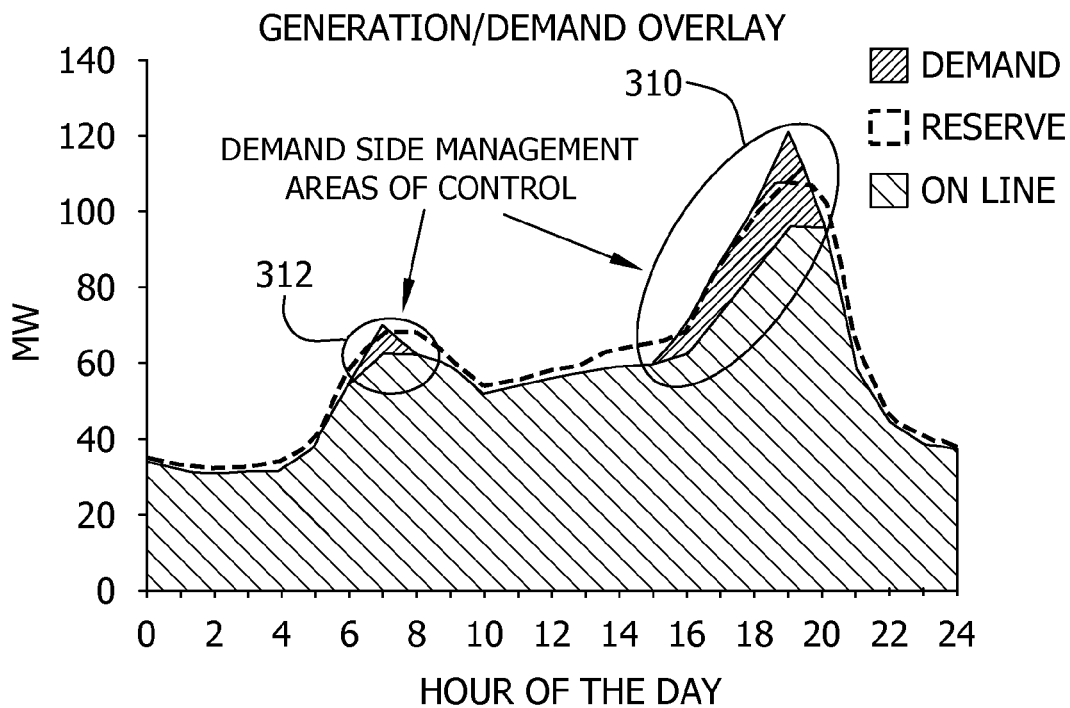
FIG. 7 shows an example of the energy supply forecast of FIG. 6 overlaid on the demand forecast shown in FIG. 5.
Figure 8:
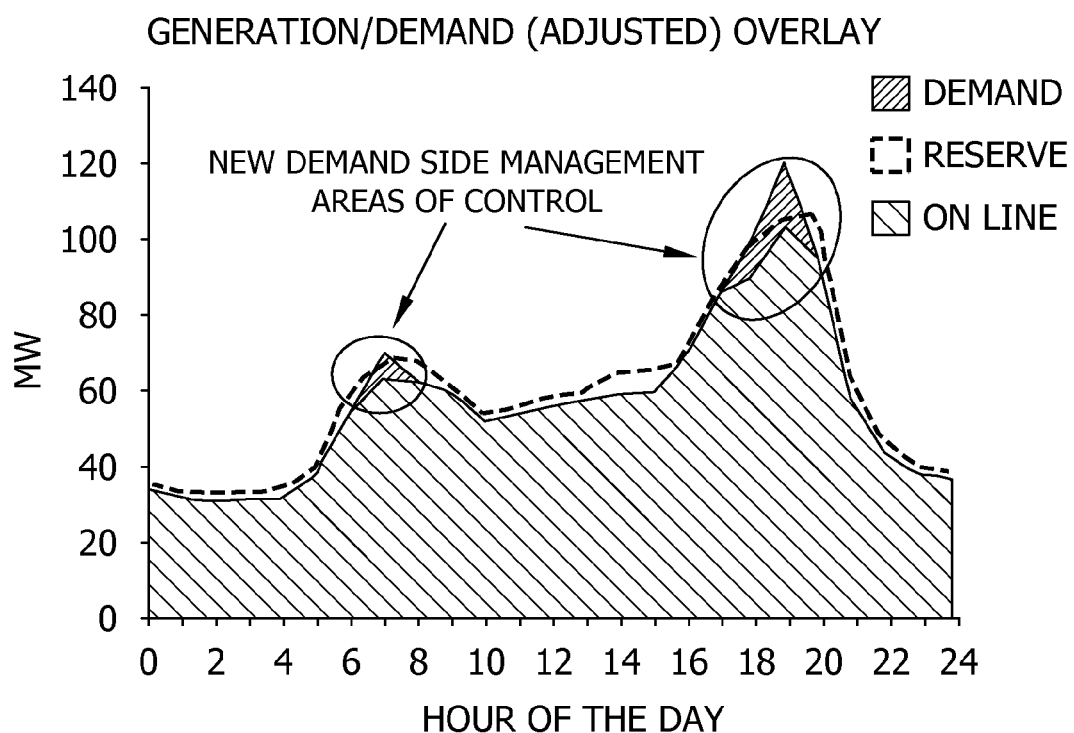
FIG. 8 shows an exemplary adjusted power generation strategy.

In contrast, if at any time within the demand forecast the demand is greater than the corresponding forecasted energy supply, in the exemplary embodiment, DSM application 102 (shown in FIG. 2B) alerts 314 the utility operator. For example, FIG. 7 illustrates an exemplary energy supply forecast (i.e., shown in FIG. 6) overlaid upon an exemplary demand forecast (i.e., shown in FIG. 5). Circled portions 310 and 312 illustrate exemplary time periods where the forecasted demand is greater than the forecasted energy supply. Alerting 314 the utility operator may include providing the operator with a graphical representation of the demand forecast and the energy supply forecast. Furthermore, DSM application 102 may provide the operator with an option to adjust 316 a power generation strategy. The adjusted power generation strategy may include increasing a level of online generated electricity at predetermined times to more completely match the energy supply forecast to the demand forecast. FIG. 8 illustrates an exemplary adjusted power generation strategy. After adjusting 316 power generation, the demand may again be compared 318 with the energy supply forecast. If at all times within the demand forecast the demand is less than the forecasted electric supply, DSM application 102 provides 320 the operator with the option of whether or not to execute the adjusted generation strategy. If the operator elects not to execute the strategy, the method for managing electrical demand in response to electrical supply conditions is complete. Alternatively, the adjusted power generation strategy is executed and the adjusted generation strategy is transmitted 322 to an energy management system.

In the exemplary embodiment, DSM application 102 requests 330 a processed list of controllable loads from, for example, customer information system 114 (shown in FIG. 2B). In the exemplary embodiment, from the list of controllable loads received from customer information system 114, DSM application creates 332 an optimized load dispatch schedule. Furthermore, DSM application 102 displays 334 recommended load shedding options to the operator, wherein the operator may select 336 a desired option. Additionally, the operator is provided 338 with the option to execute or not execute the selected load shedding plan. If the operator selects not to execute any of the recommended options, the method for managing electrical demand in response to electrical supply conditions is complete. Alternatively, DSM application 102 transmits 340 the load control schedule to, for example, SCADA 120 (shown in FIG. 2B) and/or OMS 118 (shown in FIG. 2B). DSM application 102 also transmits 320 the adjusted generation strategy to the energy management system and the method is complete.

In another aspect, a computer program embodied on a computer-readable medium which stores a set of instructions is provided. The computer program includes at least one code segment that determines a first power grid energy demand forecast using stored information, wherein the first power grid energy demand forecast includes a predicted energy usage over a predetermined time period. The computer program also includes at least one code segment that determines a first power grid energy supply forecast based on a known power grid energy production and transmission capacity, wherein the first power grid energy supply forecast includes a predicted energy supply over a predetermined time period. Furthermore, at least one code segment compares the first power grid energy demand forecast to the first power grid energy supply forecast and transmits at least one of an adjusted price signal and an electrical load shedding signal to a customer over a bi-directional communication system when the first power grid energy demand forecast and the first power grid energy supply forecast indicate greater energy usage than energy supply. The electrical load shedding signal may include at least one of a signal requesting that a customer remove an electrical load from the power grid, a signal that automatically removes the electrical load from the power grid, and a signal providing notice to the customer regarding a load being shed.

The computer program may also include at least one code segment that calculates the adjusted price to be transmitted as the adjusted price signal based at least partially on the comparison of the first energy demand to the first energy supply. The adjusted price signal may notify the customer of a price change. The computer program may also include at least one code segment that graphically displays the first energy demand and the first energy supply to a power grid operator and receives power grid operator input. The computer program may also determine a second power grid energy demand based at least partially on customer response to the adjusted price signal, transmit the electrical load shedding signal to predetermined customers to shed a quantity of electrical loads greater than the difference between the second energy demand and the first energy supply, and transmit an electrical load reconnect signal to at least one electrical load when the first energy demand is less than the first energy supply. Furthermore, the computer program may also generate a load shed schedule, wherein the load shed schedule rank orders loads available for shedding.

As described herein, demand side management generally involves voluntary load shedding, involuntary load shedding, or a combination of the two. Voluntary load shedding may also be broken into direct load control systems and rate-based load control systems. Direct load control requires that the controllable loads be enabled with a communication interface. This communication interface may be a number of different alternatives. For example, a Home Area Network (HAN) enables communication between an electric utility and a controllable load. Examples of controllable loads include programmable, digital thermostats, electric heaters, water heaters, household appliances, and pool pumps.

The DSM system and method described herein determine whether DSM actions are necessary to be implemented and the duration of those actions. The determinations are provided to a utility operator to alert them of a recommended DSM action in several "look-ahead" periods such as a week ahead, a day ahead, and an hour ahead. Through rules configured by the utility, a set of recommendations are displayed to operators which may include a number of options that will shed the appropriate amount of load required to meet the energy supply forecast.

The DSM system and method described herein facilitate delivery of direct load control signals by the SCADA system to controllable loads through the AMI network. In the exemplary embodiment, these signals are delivered to the AMI meter, to the HAN, and finally to the specific loads that are being controlled.

In the method described herein, customers may "opt-out" of the load control actions by simply overriding the control signals. For example, if one of the actions is to adjust the temperature set point of a thermostat a few degrees up or down, the consumer may elect to override that setting manually.

The DSM system and method described herein facilitate implementing direct load control at a level where the electrical service to a customer is limited or discontinued. In a load-limiting scenario, a demand limit setting is sent to the AMI meter. If the demand of the customer is higher than the limit setting, the disconnect device in the AMI meter will actuate to turn power off. After a preset time, for example, five (5) minutes, the disconnect device will turn on. If the demand continues to exceed the limit setting, the disconnect device turns off, and then waits the preset amount of time. The maximum amount of turn off-turn on cycles can be programmed in the meter. If the maximum amount of cycles are reached, then the disconnect device turns off power until the DSM actions are no longer needed. Furthermore, after the DSM actions are no longer needed, a signal from the SCADA system restores power to the customer by closing the disconnect switch in the AMI meter. Alternatively, a DSM action may include an instruction to turn-off power to the customer throughout the entire DSM action period. This may be accomplished through the disconnect switch in the AMI meter.

The rate-based DSM system and method described herein may not allow the utility to have any direct control over selected customer loads. Instead, the utility may notify the customer that a rate change will be in effect during a certain period of time. This notification may be delivered through media channels (newspaper, radio and television), through a direct contact means (telephone, e-mail, pager systems), or through a signaling device such as a specific in-premise display receiving rate signals through the AMI. The customer has the discretion to modify their usage of energy. The customer may elect to do so manually, by turning off appliances and adjusting thermostats, or the consumer may elect to use a home automation system to automatically curtail energy usage when higher rates are in effect.

The term processing device, as used herein, refers to central processing units, microprocessors, microcontrollers, reduced instruction set circuits (RISC), application specific integrated circuits (ASIC), logic circuits, and any other circuit, processor, and/or computer capable of executing the functions described herein.

As used herein, the terms "software" and "firmware" are interchangeable, and include any computer program stored in memory for execution, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for a method for managing an electrical load demand on an electrical grid. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for managing electrical demand on a power grid in response to electrical supply conditions, the method comprising:

determining a first energy demand forecast using stored information, wherein the first energy demand forecast includes a predicted energy usage over a predetermined time period;

determining a first energy supply forecast using at least a secure unit commitment module and a generation capacity forecast module, wherein the first energy supply forecast includes a predicted energy supply over the predetermined time period;

comparing the first energy demand forecast to the first energy supply forecast; and transmitting at least one of an adjusted price signal and an electrical load shedding signal to a customer over a bi-directional communication system based on the comparison of the first energy demand forecast to the first energy supply forecast.

2. A method in accordance with claim 1 further comprising calculating an adjusted price to be transmitted based at least partially on the comparison of the first energy demand forecast to the first energy supply forecast, wherein the adjusted price signal notifies the customer of a price change.

3. A method in accordance with claim 1 wherein transmitting the electrical load shedding signal comprises at least one of transmitting a signal requesting that a customer remove an electrical load from the power grid and transmitting a signal that automatically removes the electrical load from the power grid.

4. A method in accordance with claim 1 wherein determining the first energy demand forecast using stored information comprises determining the first energy demand forecast using at least one of historical weather information, historical demand information, and weather forecast information.

5. A method in accordance with claim 1 further comprising:
determining a second energy demand forecast based on a customer response to the adjusted price signal;
determining a difference between the second energy demand forecast and the first energy supply forecast; and
transmitting the electrical load shedding signal to predetermined customers to shed a quantity of electrical loads that is greater than the difference between the second energy demand forecast and the first energy supply forecast.

6. A method in accordance with claim 5 further comprising:
determining a second energy supply forecast based on a customer response to the adjusted price signal, wherein the second energy supply forecast includes an increased energy supply during peak time periods; and
determining a difference between the second energy demand forecast and the second energy supply forecast; and
transmitting the electrical load shedding signal to predetermined customers to shed a quantity of electrical loads that is greater than the difference between the second energy demand forecast and the second energy supply forecast.

7. A method in accordance with claim 1 further comprising generating a load shed schedule that rank orders loads available for shedding.

8. A method in accordance with claim 1 wherein transmitting at least one of the adjusted price signal and the electrical load shedding signal to a customer over a bi-directional communication system comprises sending at least one of the adjusted price signal and the electrical load shedding signal to a customer over at least one of a portion of an advanced metering infrastructure (AMI), a wireless communication network and a broadband over power line communication network.

9. A method in accordance with claim 1 wherein transmitting the adjusted price signal to a customer further comprises transmitting a request that a customer reduce energy usage over an upcoming period of time.

10. A method in accordance with claim 1 wherein comparing the first energy demand forecast to the first energy supply forecast comprises:
providing a graphical display of the first energy demand forecast and first energy supply forecast to a power grid operator; and
providing the power grid operator with inputs for selection of potential loads to be shed.

11. A system for managing electrical demand on a power grid in response to electrical supply conditions comprising:
a processing device configured to:
forecast a first energy demand forecast using stored information,
determine a first energy supply forecast using at least a secure unit commitment module and a generation capacity forecast module,
compare the first energy demand forecast to the first energy supply forecast, and
provide a demand side management (DSM) signal based at least partially on the comparison of the first energy demand forecast and the first energy supply forecast; and
a bi-directional communication system communicatively coupling said processing device to a plurality of customers, said bi-directional communication system configured to receive the DSM signal from said processing device and provide predetermined customers of the plurality of customers with the DSM signal.

12. A system in accordance with claim 11 further comprising a memory device communicatively coupled to said processing device, said memory device configured to store the stored information in at least one database.

13. A system in accordance with claim 11 wherein the stored information comprises at least one of historical weather data, historical demand data, and weather forecast data.

14. A system in accordance with claim 11 wherein the DSM signal comprises at least one of an adjusted price signal and an electrical load shedding signal, the adjusted price signal and the electrical load shedding signal based at least partially on the comparison of the first energy demand and the first energy supply.

15. A system in accordance with claim 11 wherein said processing device is further configured to calculate real-time pricing information based at least partially on the comparison of the first energy demand and the first energy supply.

16. A system in accordance with claim 11 wherein said processing device is further configured to rank order loads available for shedding.

17. A system in accordance with claim 11 wherein said bi-directional communication system comprises at least one of a wireless communication network and a broadband over power line communication network.

18. A system in accordance with claim 11 wherein said bi-directional communication system comprises an advanced metering infrastructure (AMI) that couples said processing device to a DSM system of a customer, said DSM system comprising at least one of a DSM visualization device and a supervisory control and data acquisition (SCADA) device.

19. A system in accordance with claim 18 wherein said DSM visualization device is configured to display at least one of the adjusted price and a load shed request to the customer.

20. A system in accordance with claim 18 wherein said SCADA device is coupled to at least one customer load and configured to directly control operation of the at least one customer load.

* * * * *